Aug. 10, 1926.
E. T. BETKER
1,595,816
VEHICLE WHEEL
Filed April 3, 1925
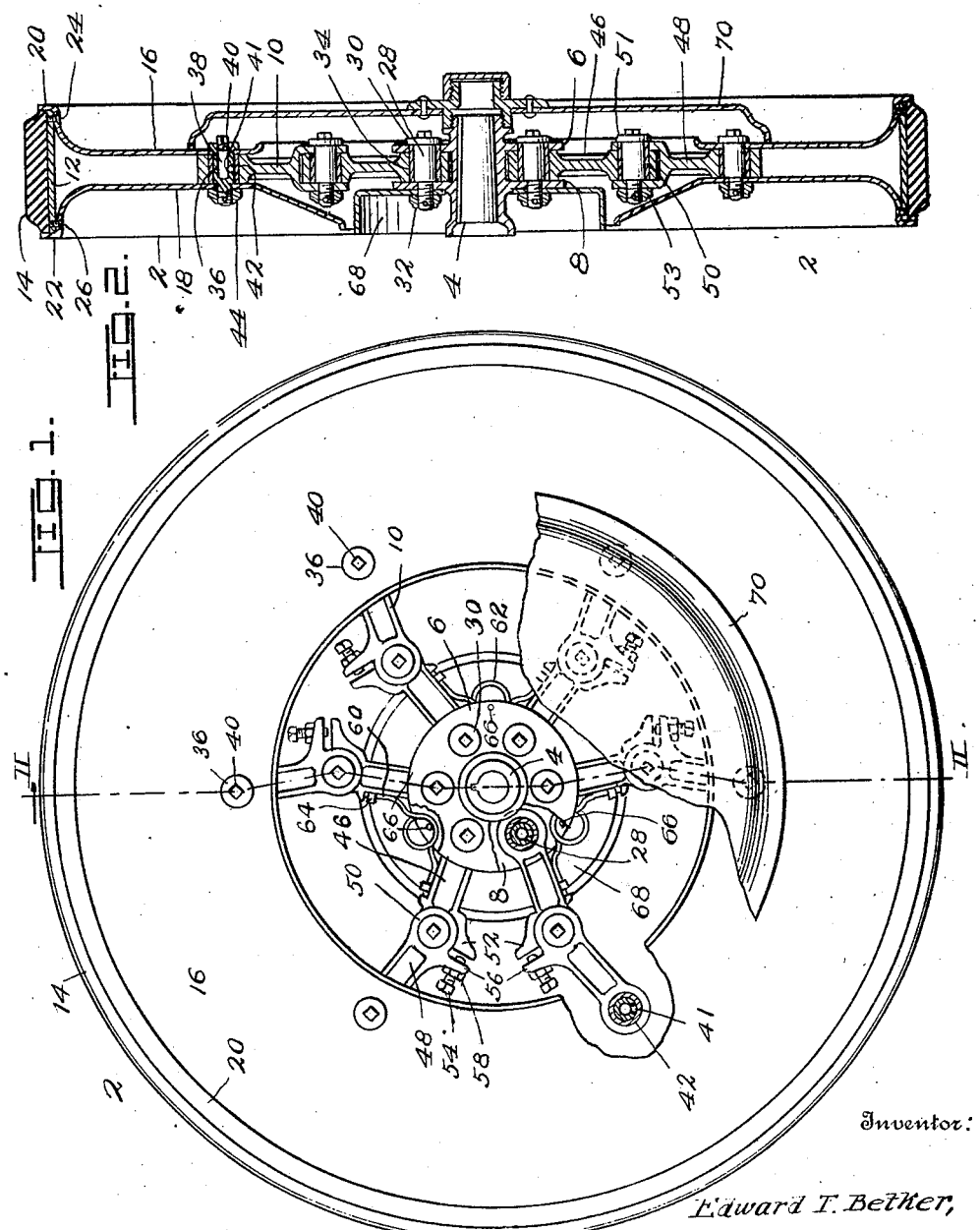
Inventor:
Edward T. Betker,
By F. G. Fischer,
Attorney.
Witness:
Fred C. Fischer.

Patented Aug. 10, 1926.

1,595,816

UNITED STATES PATENT OFFICE.

EDWARD T. BETKER, OF KANSAS CITY, MISSOURI.

VEHICLE WHEEL.

Application filed April 3, 1925. Serial No. 20,515.

My invention relates to wheels for road vehicles such, for instance, as motor trucks and passenger automobiles, and my chief object is to provide a new and useful wheel of this character incorporating yieldable parts for absorbing shocks incident to running on the road, so that the pneumatic tires usually employed for such purpose may be dispensed with, to the end that the trouble and expense due to punctures and blow-outs may be eliminated.

In order that the invention may be fully understood, reference will now be had to the accompanying drawing, in which:

Fig. 1 is a side elevation of the wheel with some of the parts broken away and others in section.

Fig. 2 is an irregular vertical central section on line II—II of Fig. 1.

Referring now in detail to the different parts, 2 designates the wheel in general, which embodies a hub 4 having peripheral flanges 6 and 8 spaced apart to receive the inner ends of a plurality of yieldable spokes 10.

12 designates the rim of the wheel which is equipped with a solid rubber or other suitable tire 14.

16 and 18 designate two annular plates spaced apart to receive the outer ends of the spokes 10 and provided with peripheral flanges 20 and 22, respectively, for holding the tire 14 upon the rim 12. The plates 16 and 18 are secured upon the rim 12 by suitable means such as screws 24 and 26, respectively, so that either plate may be removed for placement or removal of the tire 14.

The inner ends of the spokes 10 are operably secured between the hub flanges 6 and 8 by pivots 28, each having a flange 30 at one end and a reduced threaded opposite end to receive a nut 32, which cooperates with the flange 30 in holding said pivot in place. Suitable bushings 34 are interposed between the pivots 28 and the inner ends of the spokes 10 to relieve the same of undue wear.

The outer ends of the spokes 10 are secured between the plates 16 and 18 by pivots 36, which are similar in construction to the pivots 28 and like the same have lubricant chambers 38 which are closed at the flanged ends of said pivots 36 by screw plugs 40, so that access may be had to said chambers to supply the same with a lubricant which is free to flow through ports 41 to the working parts of the joints. The pivots 36 extend through bushings 42 and are held in position by nuts 44.

To lend more or less resiliency to the wheel 2, each spoke consists of inner and outer sections 46 and 48 respectively, connected together by knuckle joints 50 having pivots 51 similar to the pivots 28 and 36. Each inner spoke section 46, has an integral abutment 52 arranged for contact with the inner end of an adjustable stop as a set screw 54 threaded in a projection 56 on each outer spoke section 48. A lock nut 58 is threaded on each set screw 54 to engage the associate projection 56 and secure said set screw 54 at any point of its adjustment.

The spokes 10 are yieldably connected in pairs by suitable springs 60, each of which has a coil 62 intermediate its ends, which is secured to the two adjacent inner spoke sections 46 by suitable means such as lugs 64. The coils 62 are held from displacement by the hub flanges 6 and 8 and pins 66, which latter extend transversely through said hub flanges and said coils.

If desired the wheel may be equipped with a brake drum 68 which is secured to the hub flange 8 by pivots 28.

A disk-like dust guard 70 is threaded upon the outer end of the hub 4 to coact with the annular plates 16 and 18 and the drum 68 in excluding dust from the joints and pivots of the spokes 10.

Normally the spokes 10 are held in the bent or slightly collapsed position, Fig. 1, by the springs 60, but when the wheels are mounted on the axles of a vehicle the weight of said axles and the load carried thereby forces the hubs 4 of the wheels downwardly, thereby straightening out the uppermost spokes 10 which carry the load and causing the lowermost spokes to further bend at their knuckle joints 50. The foregoing operation also takes place while the wheels are running on the road and thereby renders said wheels more or less resilient without incurring the disadvantages arising from the use of pneumatic tires.

If desired the set screws 54 may be adjusted inwardly far enough to prevent the spokes 10 from entirely straightening out, so that they will bend more freely at their knuckle joints 50 as they move downwardly with the rotation of the wheel.

From the foregoing description it is apparent that I have provided a wheel embodying the advantages above pointed out, and while I have shown and described the preferred construction, combination and arrangement of parts, I reserve the right to such changes as properly fall within the spirit and scope of the invention as claimed.

Having thus described my invention, what I claim and desire to secure by Letters Patent, is:

1. In a wheel of the character described, a hub, a rim, annular plates fixed to said rim, spoke sections operably connected to said hub, companion spoke sections operably connected to the first-mentioned spoke sections and said annular plates, springs having coils and connecting the spokes in pairs, and pins extending through the hub and said coils.

2. In a wheel of the character described, a hub, a rim, annular plates connected to said rim, inner spoke sections operably connected to said hub and provided with abutments, outer spoke sections operably connected to said annular plates and the inner spoke sections, spring means tending to hold the companion spoke sections in slightly collapsed position, and means on the outer spoke sections for contacting said abutments and thereby limiting the collapsible movements of the spoke sections.

3. In a wheel of the character described, a hub, a rim, annular plates connected to said rim, inner spoke sections operably connected to said hub and provided with abutments, outer spoke sections operably connected to said annular plates and the inner spoke sections, spring means tending to hold the companion spoke sections in slightly collapsed position, projections on the outer spoke sections adjacent to the abutments on the inner spoke sections, and adjustable means threaded through said projections for engagement with the abutments to limit the collapsible movement of the spoke sections.

In testimony whereof I affix my signature.

EDWARD T. BETKER.